April 29, 1930.                W. F. CECIL                1,756,180
                          CULTIVATOR ATTACHMENT
                            Filed May 16, 1929        2 Sheets-Sheet 1
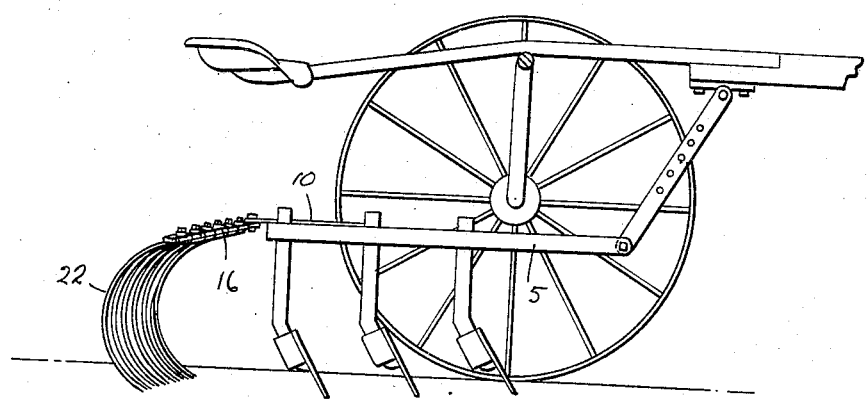
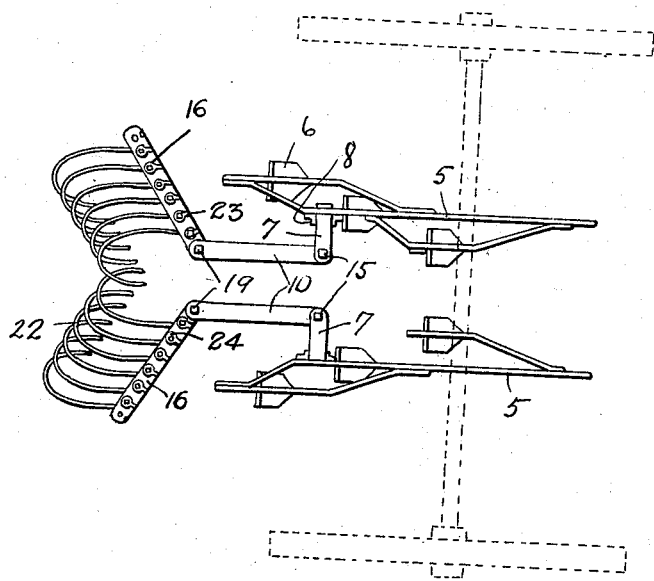
Inventor
William F. Cecil
By Clarence A. O'Brien
                Attorney

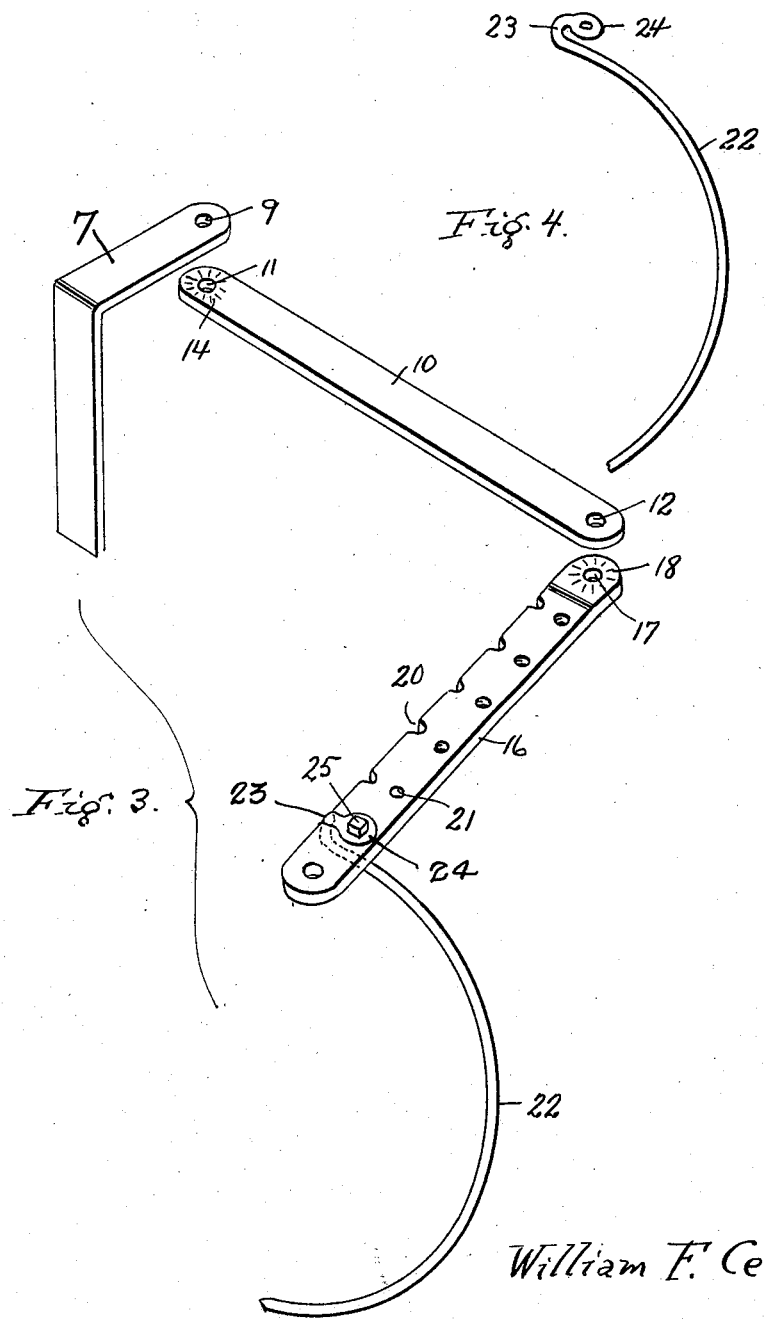

Patented Apr. 29, 1930

1,756,180

UNITED STATES PATENT OFFICE

WILLIAM F. CECIL, OF HOLLAND, MISSOURI

CULTIVATOR ATTACHMENT

Application filed May 16, 1929. Serial No. 363,466.

The present invention relates to an attachment for cultivators and has for its object to provide means extending to the sides of a cultivator while plowing little corn, cotton or the like and provided with teeth which come together on the row behind the plows of the cultivator and remove the clods of dirt off the stalks which are apt to fall thereon and to leave the loose dirt or soil around the stalks thereby saving the farmer of the necessity of stopping to uncover the row.

Another very important object of the invention resides in the provision of an attachment of this nature which is exceedingly simple in its construction, inexpensive to manufacture, adjustable, strong and durable, thoroughly efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a side elevation of a cultivator showing my attachment mounted thereon, Figure 2 is a top plan view thereof, Figure 3 is a perspective view of one of the attachments, and Figure 4 is a perspective view of one of the teeth.

Referring to the drawing in detail it will be seen that I have illustrated an ordinary well known type of two-row cultivator including two main beams 5 having mounted thereon in the usual manner shovels 6. L-shaped brackets 7 are clamped or otherwise fixed as at 8 on the rear portions of the beams 5 and have openings 9 in the extremities thereof.

Bars 10 are provided with end openings 11 and end openings 12 the former having serrations 14 disposed thereabout. Bolts 15 pass through openings 9 and 11 and hold the bars 10 at desired angles in respect to the brackets.

These bars 10, as shown, extend rearwardly. Attachment beams 16 are provided with end openings 17 and with serrations 18 thereabout and bolts 19 pass through openings 12 and 17 to hold the beams 16 at desired angles in respect to the bars 10 so as to extend laterally and outwardly therefrom approximately as is shown to advantage in Figure 2.

Each beam 16 is provided at its leading edge with a plurality of spaced notches 20 and in its intermediate portion adjacent its trailing edge with openings 21, one in front of each notch 20. Generally ogee-shaped teeth include elongated curved body portions 22 and short sharply curved shank portions 23 said shank portions 23 straddling the leading edges of the beam and being disposed in the notches 20 and terminating in eyes 24 through which extend bolts 25 threaded in openings 21.

From the above detailed description it will be seen that the attachment may be so adjusted so that the teeth trail behind the shovels 6 when plowing and catch hold of clods of dirt and separate them from the stalks of the plant leaving around the stalks piles of loose dirt as is desired.

It is thought that the construction, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. An attachment of the class described comprising a bracket adapted to be attached to a cultivator, a bar adjustably engaged with the bracket to extend laterally therefrom, a beam, means for adjustably connecting the beam with the bar, said beam having a plurality of notches at one edge and a plurality of openings one in the rear of each notch, and a plurality of teeth having curved shank portions straddling the edge provided with a notch, one curved shank seated in each notch and said curved shank terminating in eyes and bolts extending through the eyes and threadedly engaged in the openings.

2. An attachment of the class described comprising a bracket adapted to be attached to a cultivator, a bar adjustably engaged with the bracket to extend laterally therefrom, a beam, means for adjustably connecting the beam with the bar, said beam having a plurality of notches at one edge and a plurality of openings one in the rear of each notch, and a plurality of teeth having curved shank portions straddling the edge provided with a notch, one curved shank seated in each notch and said curved shank terminating in eyes and bolts extending through the eyes and threadedly engaged in the openings, each tooth having an elongated curved body.

3. In combination, a cultivator including a beam, a bracket mounted on the beam, a bar extending rearwardly from the bracket, a beam extending laterally from the rear end of the bar, and teeth on said beam, said beam having notches in its forward edge and openings one in the rear of each notch and said teeth having curved shanks straddling the forward edge of the beam one in each notch and terminating in eyes registering with the openings, bolts extending through the eyes and threaded in said opening.

In testimony whereof I affix my signature.

W. F. CECIL.